June 4, 1946.   C. W. HAWTHORNE   2,401,639
SHEARING APPARATUS
Filed Nov. 22, 1944   2 Sheets-Sheet 1
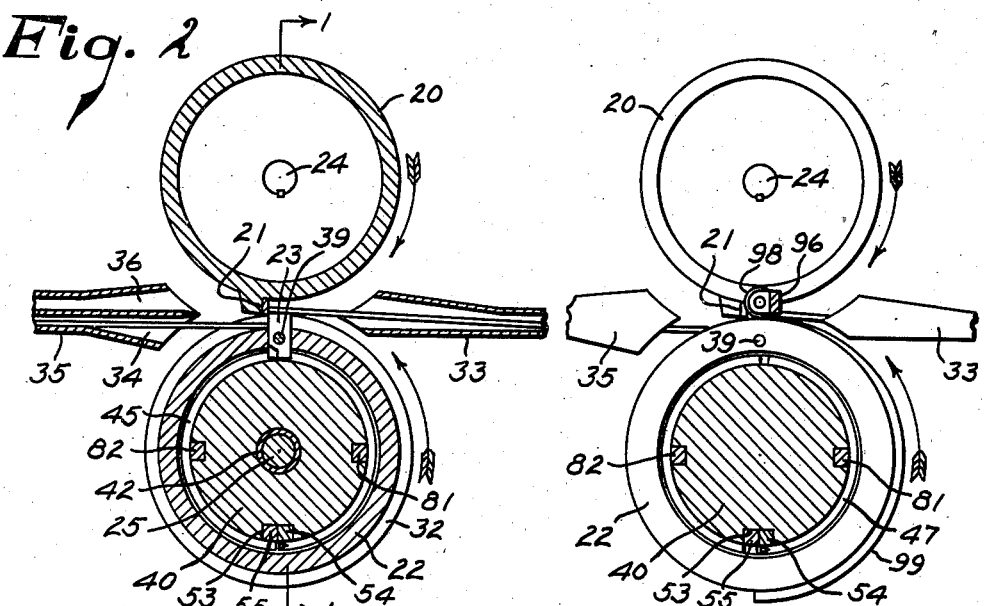
Fig. 2
Fig. 3
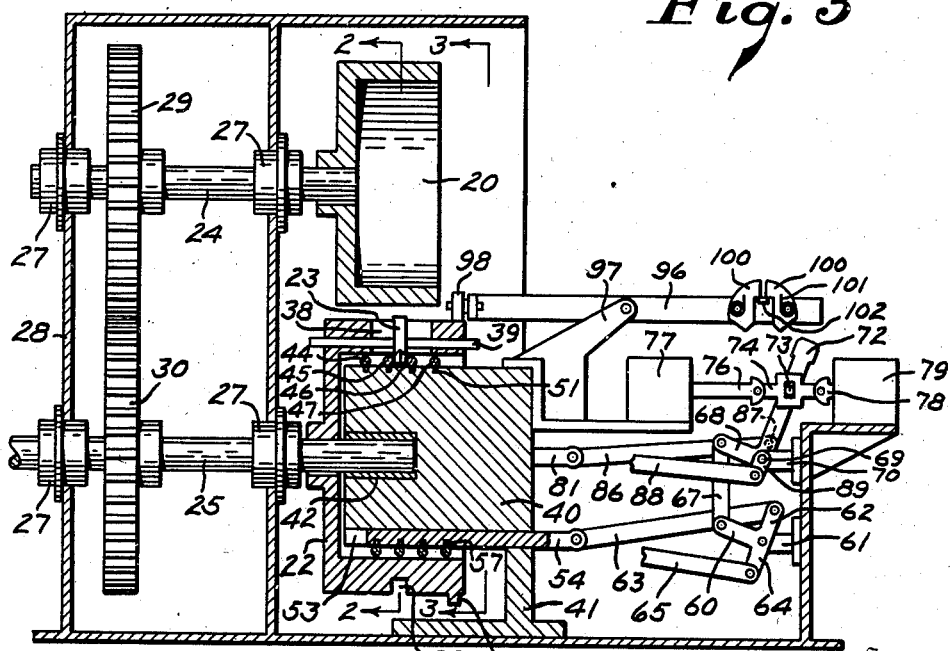
Fig. 1
Inventor
CHARLES W. HAWTHORNE
By Albert G. Blodgett
Attorney

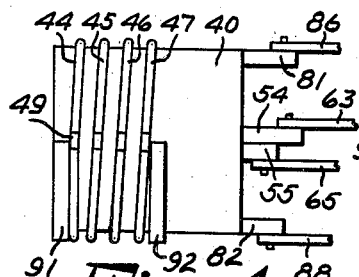
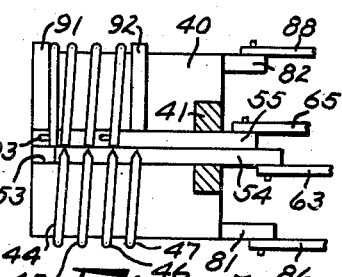
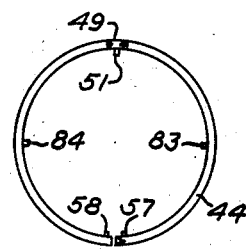
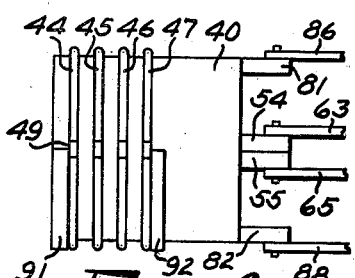
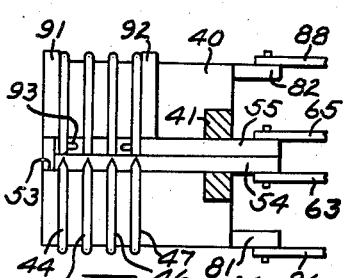
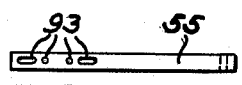
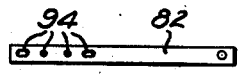
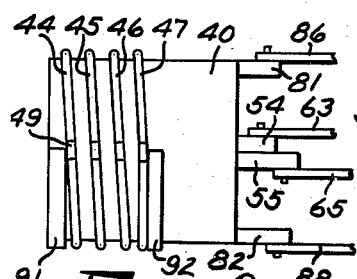
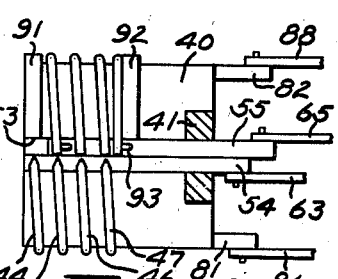
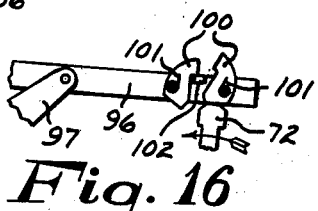
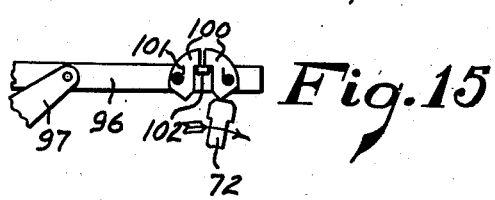

Patented June 4, 1946

2,401,639

UNITED STATES PATENT OFFICE 2,401,639

SHEARING APPARATUS

Charles W. Hawthorne, Conneautville, Pa., assignor to Morgan Construction Company, Worcester, Mass., a corporation of Massachusetts Application November 22, 1944, Serial No. 564,644

14 Claims. (Cl. 164—68)

This invention relates to shearing apparatus, and more particularly to apparatus for severing metal bars as they travel longitudinally at high speed.

In the manufacture of metal rod for use in wire-drawing, it is the usual practice to supply heated billets to a continuous rod rolling mill which discharges its rolled product to suitable reels arranged to coil the rod into annular bundles. Thus all the material in one billet (except for losses from cropping of the ends and oxidation) goes into a single bundle, and the bundles weigh substantially the same as the billets. In some circumstances it would be advantageous to form two or more rod bundles from a single billet, and this could be accomplished by severing the finished rod and coiling the pieces separately. However, the delivery speed of modern rod mills is in excess of seventy feet per second, and the cutting and switching of metal bars at such speeds is a very difficult matter.

It is accordingly one object of the invention to provide a shearing apparatus capable of severing bars as they travel longitudinally at very high speeds.

It is a further object of the invention to provide a shearing apparatus capable of severing metal rods as they are discharged from a rod rolling mill.

It is a further object of the invention to provide a shearing apparatus capable of severing a rapidly traveling metal bar and directing the front end of the second portion of the bar into a different path of travel.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a transverse section through a shearing apparatus, the section being taken on the line 1—1 of Fig. 2;

Fig. 2 is a section taken on the line 2—2 of Fig. 1;

Fig. 3 is a section taken on the line 3—3 of Fig. 1;

Fig. 4 is a top plan view of certain blade controlling mechanism, adjusted for inward movement of the blade;

Fig. 5 is a bottom plan view of the mechanism as shown in Fig. 4;

Fig. 6 is a top plan view of the blade controlling mechanism in its neutral position;

Fig. 7 is a bottom plan view of the mechanism as shown in Fig. 6;

Fig. 8 is a top plan view of the blade controlling mechanism, adjusted for outward movement of the blade;

Fig. 9 is a bottom plan view of the mechanism as shown in Fig. 8;

Fig. 10 is an elevation of a blade-controlling ring, removed from the assembly;

Fig. 11 is an enlarged sectional detail of a joint in the blade-controlling ring;

Fig. 12 is a detail of a slide bar;

Fig. 13 is a detail of another slide bar;

Fig. 14 is a view of a safety lever with a blade-controlling lever in neutral position;

Fig. 15 is a view similar to Fig. 14 but showing the blade-controlling lever leaving its neutral position; and Fig. 16 is a view similar to Fig. 14 but showing the blade-controlling lever returning to its neutral position.

Referring first to Figs. 1, 2 and 3, the embodiment illustrated comprises an upper drum 20 having a shear blade 21 thereon and a lower drum 22 having a shear blade 23 thereon, these drums being mounted on parallel horizontal rotatable shafts 24 and 25 respectively. These shafts are mounted in suitable bearings 27 carried by a frame or casing 28, the shafts being connected by a pair of gears 29—30 within the casing. The lower shaft 25 extends beyond the casing so that it may be connected to a suitable driving means, such as an electric motor (not shown). The drums are rotated at such a speed that the peripheral speed of the blades will correspond rather closely to the speed of the rod which is to be severed. For example, if the speed of the rod is 70 feet per second, and the shear blades revolve in a circle say 18 inches in diameter, the drums should rotate at approximately 15 revolutions per second.

Means is provided to control the path of the rod as it travels through the shearing apparatus. For this purpose the lower drum 22 is provided with a peripheral groove 32 which is located in the same vertical plane as the upper blade 21. The approaching front end of each rod is directed tangentially into this groove 32 by a substantially horizontal guide pipe 33, and after this front end has passed between the drums it enters the lower passage 34 of a substantially horizontal guide pipe 35. This pipe 35 is also provided with an upper passage 36, and it will be understood that the two passages 34 and 36 may lead to separate rod coiling mechanisms (not shown).

The various parts are so constructed and arranged that the lower blade 23 may be moved transversely from a position at one side of the groove 32 to a position at the other side thereof, each of said positions being located beyond the groove, the blade being at the highest point in its orbit when aligned with the groove, as shown in Figs. 1 and 2. At that same instant the upper blade 21 will be at the lowest point in its orbit and in overlapping shearing relationship to the lower blade. Consequently the rod will be severed by the cooperative action of the blades. Preferably the upper blade overlaps the front surface of the lower blade, so that the lower blade will lift the new front end of the severed rod and cause it to enter the upper passage 36 an instant later. The lower blade 23 is positioned within a transverse slot 38 in the drum 22, and this blade is secured to a pin 39 which is slidably mounted in the drum. The lower drum 22 is of hollow construction, and the inner portion of the blade 23 extends a short distance into the interior of the drum to form a follower which will cooperate with other mechanisms to control the position of the blade. It will be understood that when the lower blade is positioned at either side of the groove 32, the rod may travel freely from the guide pipe 33, through the groove 32, and into the guide pipe 35 without interference with either of the blades.

The mechanism for controlling the lateral position of the lower blade will now be described. This mechanism comprises a stationary horizontal cylinder 40 which is located within the interior of the hollow lower drum 22 and coaxial therewith. This cylinder is supported on the bottom of the casing 28 by a suitable bracket 41 shown integral with the cylinder. Preferably the cylinder is recessed at its inner end to provide a pilot bearing 42 for the adjacent end of the shaft 25. The cylinder 40 is surrounded by four axially spaced rings 44, 45, 46 and 47, each of which is divided at its lowermost point to provide two separable ends. By shifting these ends laterally in directions parallel with the axis of the cylinder, the rings can be deformed to provide right-hand or left-hand helices, which will cause the blade 23 to shift in a desired direction. This deformation is facilitated by constructing each ring with two semi-circular portions having their upper ends connected to a short junction piece 49 by ball-and-socket joints 50 (Fig. 11). Each junction piece is provided with a pin 51 which projects into a hole in the top of the cylinder to hold the upper portions of the rings spaced apart equally at a distance sufficient to receive the inner portion of the blade 23 between them. It will be apparent that if the rings are in the neutral position as shown in Figs. 6 and 7 with each ring lying in a plane perpendicular to the axis of the cylinder 40, they will form three axially spaced circumferential grooves between them. The innermost of these grooves (between the rings 44 and 45) may be used to maintain the revolving lower blade 23 at the inner side of the rod-guiding groove 32, and the outermost of these grooves (between the rings 46 and 47) may be used to maintain the blade at the outer side of the groove 32.

Various mechanisms may be utilized to control the positions of the rings. Preferably a longitudinally extending groove 53 is provided in the bottom of the cylinder 40 to receive two slidable bars 54 and 55, the bar 54 being in front of the bar 55, i. e. nearer the up-running portion of the lower drum 22. These bars are connected to the adjacent ends of the rings, and for this purpose the front ends of the rings are provided with pins 57 (Fig. 10) which project into holes in the bar 54, while the rear ends of the rings are provided with pins 58 which project into holes in the bar 55. In order to actuate the slidable bars, a bell crank lever 60 (Fig. 1) is fulcrumed on a bracket 61, this lever having an upwardly projecting arm 62 connected by a link 63 to the front bar 54, and a downwardly projecting arm 64 connected by a link 65 to the rear bar 55. The lever 60 is connected by a link 67 to a bell crank lever 68 secured to a shaft 69 which is journaled in a bracket 70. The lever 68 has an upwardly extending arm 72 carrying a pin 73 for engagement with a slotted yoke 74. This yoke is connected at its inner end to the plunger 76 of a solenoid 77, and at its outer end to the plunger 78 of a solenoid 79. With this construction, energization of the solenoid 79 will pull the plunger 78 in an outward direction, as shown in Fig. 1, sliding the bar 54 outwardly and the bar 55 inwardly. Energization of the solenoid 77 will slide the bars in the opposite directions. The total stroke of each bar is substantially equal to the distance between the center lines of adjacent rings.

It is desirable to control the rings not only at their upper or fixed points and at their lower separable ends but also at intermediate points located approximately ninety degrees from the fixed points. Accordingly the cylinder 40 is provided with a longitudinal slot at its front side to receive a slidable bar 81, and with a longitudinal slot at its rear side to receive a slidable bar 82. The front portions of the rings are provided with pins 83 (Fig. 10) which project into holes in the front bar 81, and the rear portions of the rings are provided with pins 84 which project into holes in the rear bar 82. The front bar 81 is connected by a link 86 to an arm 87 (Fig. 1) which projects upwardly from the shaft 69, and the rear bar 82 is connected by a link 88 to an arm 89 which projects downwardly from the shaft 69. The arms 87 and 89 are approximately half the length of the arms 62 and 64, so that the stroke of the bars 81 and 82 will be substantially half the stroke of the bars 54 and 55.

It will now be apparent that if the control arm 72 is moved to either of its extreme positions by momentary energization of one or the other of the solenoids 77—79, the rings will be shifted to form helices or screw-threads, causing the lower blade 23 to slide laterally along the slot 38 while traveling along the helical guideway formed by the rings. As the blade reaches the end of the slot, so that further lateral movement is prevented, it will crowd the adjacent ring 45 or 46 (as the case may be) in a lateral direction into its neutral position, and because of the interconnection of the rings all the other rings will return to neutral position. In order to provide a better support for the blade during this lateral crowding action, the cylinder 40 is provided with a projecting flange 91 (Figs. 6 and 7) located adjacent the inner side of the innermost ring 44, and a projecting flange 92 located adjacent the outer side of the outermost ring 47. These flanges extend through only about one-half the circumference of the drum, at the rear side thereof, and they prevent the rear portions of the adjacent rings 44—47 from being moved beyond their neutral positions in one direction. Thus the rear portion of the inner ring 44 cannot be moved inwardly beyond its neutral position, and the rear portion of the outer ring 47 cannot be moved outwardly beyond its neutral position. In order that this limiting of the movement of certain rings may not interfere with the full stroke of the associated slide bars 55 and 82, these bars are constructed to provide a lost-motion connection with the rings 44 and 47. As shown in Fig. 12, the bar 55 has a row of four holes 93 therein to receive the pins 58 of the rings, the innermost and outermost holes being elongated toward the intermediate holes. Similarly, as shown in Fig. 13, the bar 82 has a row of four holes 94 therein to receive the pins 84 of the rings, the innermost and outermost holes being elongated toward the intermediate holes, the amount of elongation however being less than in the case of the holes 93 since the stroke of the bar 82 is about one-half that of the bar 55.

It is important to avoid shifting the rings away from the neutral position when the lower blade 23 is about to cross the joints at the bottoms of the rings, as this might cause the blade to strike the end of a ring. This possibility is minimized by pointing or beveling the front edge of the blade as well as the front ends of the rings. As a further precaution, a horizontal safety lever 96 is fulcrumed on a bracket 97 (Fig. 1), the inner end of the lever carrying a roller 98 for engagement with a cam 99 on the periphery of the lower drum 22. This cam extends throughout about one-half the circumference of the drum, behind the blade 23, so that the cam will engage the roller 98 and lift the inner end of the lever 96 as the blade starts downwardly. As the blade passes the ring joints beneath the cylinder 40, the cam will pass from beneath the roller. On the outer end of the lever 96 there are pivotally mounted two spaced dogs 100 arranged to receive the upper end of the shift lever 72 between their lower portions, as shown in Fig. 14, when the shift lever is in its neutral position. Coiled springs 101 bias these dogs about their pivots and tend to swing their upper portions toward one another, but this movement is limited by a lug 102 on the lever 96. Consequently the dogs will prevent the shift lever 72 from leaving its neutral position so long as the cam 99 engages the roller 98 on the inner end of the safety lever 96. When the cam is out of engagement with the roller, the shift lever can be moved to either side of its neutral position, since the upper end of the shift lever and the lower portions of the dogs 100 are formed with cooperating inclined surfaces arranged to lift the outer end of the safety lever when the shift lever starts to move, as shown in Fig. 15. When the shift lever returns to neutral position it will swing one of the dogs 100 upwardly, as shown in Fig. 16, and pass beneath the same, whereupon the corresponding spring 101 will snap the dog back into its normal position to lock the shift lever in neutral position.

It will now be apparent that the front end of each rod will approach the shearing apparatus through the guide 33, pass through the groove 32 in the lower drum 22, and enter the lower passage 34 in the guide 35. At this time the shift lever 72 will be in neutral position, the four rings 44, 45, 46 and 47 will lie in parallel vertical planes, as shown in Figs. 6 and 7, and the lower blade 23 will be revolving at one side of the groove 32, say the outer side, between the rings 46 and 47. When approximately one-half of the length of the rod has passed the shear, the solenoid 79 will be momentarily energized by any suitable control apparatus, swinging the lever 72 outwardly as shown in Fig. 1. If at the instant the solenoid is energized the cam 99 is in engagement with the roller 98, the dogs 100 on the safety lever 96 will delay the movement of the shift lever for an instant until the blade 23 has passed the joints at the bottoms of the rings. The outwardly moving shift lever will act through the associated links and levers to slide the bars 54 and 81 outwardly and the bars 55 and 82 inwardly, as best shown in Figs. 4 and 5, so that the rings will be shifted to form a left-hand helical groove along which the blade 23 will travel. This will shift the blade inwardly along the slot 38, and as the blade passes over the top of the drum 22 between the two intermediate rings 45 and 46, it will be aligned with the groove 32 and the rod therein. Consequently the blade 23 will force the rod upwardly against the revolving upper blade 21, which will be in its lowermost position at that time, as shown in Fig. 2, thereby severing the rod and directing the new front end of the rod into the upper passage 36 of the guide 35. By the time the lower blade 23 has completed one more revolution it will have moved laterally to the inner side of the groove 32 and out of the path of the rod. Thereupon the blade will move downwardly between the rear portions of the rings 44 and 45 and crowd the rear portion of the ring 45 laterally into its neutral position, the remaining rings being returned to neutral positions simultaneously by the mechanical connection afforded by the slide bars, links and levers. After the following rod has arrived and about half the length thereof has passed the shear, the solenoid 77 will be energized momentarily, swinging the shift lever 72 inwardly. This will slide the bars 54 and 81 inwardly and the bars 55 and 82 outwardly, as shown in Figs. 8 and 9, so that the rings will be shifted to form a right-hand helical groove along which the blade 23 will travel. This will shift the blade outwardly along the slot 38, and as the blade passes over the top of the drum 22 between the two intermediate rings 45 and 46, it will cooperate with the upper blade 21 to sever the rod and direct the new front end thereof into the passage 36. The blade 23 will continue around the helical groove formed by the rings, and as it starts downwardly between the rear portions of the rings 46 and 47 it will crowd the ring 46 laterally into its neutral position, at the same time moving the other rings and the ring actuating mechanism into neutral position. The blade will then continue to revolve in its outer position between the rings 46 and 47 until the time arrives for the next cut to be made.

The apparatus is well adapted for operation at very high speeds, as there is a minimum of disturbance to the rod. Except for the slight lifting of the rod at the time of the cut, the rod travels in substantially a straight line through the apparatus. The shifted rings provide a positive control for the lower blade so that it will be in exactly the correct position to effect a cut in cooperation with the upper blade and yet be at one side of the rod before another revolution is completed. Hence there is no danger of making two cuts in rapid succession on the same rod.

Having thus described my invention, what I claim as new and desire to secure by Letters Patent is:

1. Apparatus for severing longitudinally traveling bars comprising a revoluble drum, a blade mounted on the drum, means to guide each approaching bar in a path adjacent the drum and tangential thereto, and means to move the blade along a helical path from a position at one side of the path of the bar to a position at the other side thereof, each of said positions being located beyond the path of the bar, the path of the blade intersecting the path of the bar during such movement of the blade to effect severance of the bar.

2. Apparatus for severing longitudinally traveling bars comprising a revoluble drum having a peripheral groove therein, a blade mounted on the drum, means to guide each approaching bar tangentially into the groove, and means to shift the blade from a position at one side of the groove to a position at the other side thereof, each of said positions being located beyond the groove, the blade engaging the bar to sever the same during such shifting of the blade.

3. Apparatus for severing longitudinally traveling bars comprising a revoluble drum having a peripheral groove therein, a blade mounted on the drum, means to guide each approaching bar in a path extending tangentially through the groove, and means to move the blade along a helical path from a position at one side of the groove to a position at the other side thereof, each of said positions being located beyond the groove, the path of the blade intersecting the path of the bar during such movement of the blade to effect severance of the bar.

4. Apparatus for severing longitudinally traveling bars comprising a revoluble drum, a blade mounted on the drum, means to guide each approaching bar in a path adjacent the drum and tangential thereto, and control mechanism for the blade including a plurality of rings shiftable into a helix to move the blade across the path of the bar and sever the same.

5. Apparatus for severing longitudinally traveling bars comprising two drums rotatable about parallel axes, a blade mounted on each drum, means to guide each approaching bar in a path between the drums, and means to shift one of said blades on its respective drum from a position at one side of the said path to a position at the other side thereof, each of said positions being located beyond the path of the bar, the two blades meeting adjacent the bar to sever the same during such shifting of one blade.

6. Apparatus for severing longitudinally traveling bars comprising a revoluble drum, a blade mounted on the drum to form a cutting element, means forming a guiding element to guide each approaching bar in a path adjacent the drum and tangential thereto, and mechanism for moving one of said elements longitudinally of the drum and causing the blade to engage and sever the bar, the said mechanism including a plurality of spaced coaxial rings and means to shift the rings into a helix.

7. Apparatus for severing longitudinally traveling bars comprising a revoluble drum, a blade mounted on the drum to form a cutting element, means forming a guiding element to guide each approaching bar in a path adjacent the drum and tangential thereto, a plurality of spaced coaxial rings, means to shift the rings into a helix, and a revoluble device engaging the rings and connected to one of said elements to move the same longitudinally of the drum and thereby cause the blade to engage and sever the bar.

8. Apparatus for severing longitudinally traveling bars comprising a revoluble drum, a blade mounted on the drum, means to guide each approaching bar in a path adjacent the drum and tangential thereto, a plurality of spaced coaxial rings, means to shift the rings into a helix, and a revoluble device engaging the rings and connected to the blade to move the same longitudinally of the drum and thereby cause the blade to engage and sever the bar.

9. Apparatus for severing longitudinally traveling bars comprising a revoluble hollow drum having a slot in its peripheral wall, the slot extending longitudinally of the drum, a blade mounted in the slot and slidable along the same, means to guide each approaching bar in a path adjacent the drum and tangential thereto, a stationary member located within the drum, a plurality of spaced coaxial rings mounted on the member, the inner portion of the blade projecting between the rings, and means to shift the rings into a helix and thereby move the blade along the slot to engage and sever the bar.

10. Apparatus for severing longitudinally traveling bars comprising a revoluble hollow drum having a slot in its peripheral wall, the slot extending longitudinally of the drum, a blade mounted in the slot and slidable along the same, means to guide each approaching bar in a path adjacent the drum and tangential thereto, a stationary member located within the drum, a plurality of spaced coaxial rings mounted on the member and each divided at one point to provide two separable ends, the inner portion of the blade projecting between the rings, and means to shift the ends of the rings in directions substantially parallel with the axis of the drum and form the rings into a helix, thereby moving the blade along the slot to engage and sever the bar.

11. Apparatus for severing longitudinally traveling bars comprising a revoluble hollow drum having a slot in its peripheral wall, the slot extending longitudinally of the drum, a blade mounted in the slot and slidable along the same, means to guide each approaching bar in a path adjacent the drum and tangential thereto, a stationary cylindrical member located within the drum and coaxial therewith, a plurality of spaced rings surrounding the member and each secured thereto at one point in the ring circumference and divided at a diametrically opposite point to provide two saparable ends, and means to shift the ends of the rings in opposite directions substantially parallel with the axis of the drum and form the rings selectively into a right-hand or a left-hand helix, thereby moving the blade along the slot in the direction necessary to engage and sever the bar.

12. Apparatus for severing longitudinally traveling bars comprising a revoluble hollow drum having a slot in its peripheral wall, the slot extending longitudinally of the drum, a blade mounted in the slot and slidable along the same, means to guide each approaching bar in a path adjacent the drum and tangential thereto, a stationary cylindrical member located within the drum and coaxial therewith, a plurality of spaced rings surrounding the member and each secured thereto at one point in the ring circumference and divided at a diametrically opposite point to provide two separable ends, two devices slidably supported in the stationary member for movement substantially parallel with the axis thereof and secured to the end portions of the rings on opposite sides of the division therein, and means to slide the said devices simultaneously in opposite directions and form the rings into a helix, thereby moving the blade along the slot to engage and sever the bar.

13. Apparatus for severing longitudinally traveling bars comprising a revoluble hollow drum having a slot in its peripheral wall, the slot extending longitudinally of the drum, a blade mounted in the slot and slidable along the same, means to guide each approaching bar in a path adjacent the drum and tangential thereto, a stationary cylindrical member located within the drum and coaxial therewith, a plurality of spaced rings surrounding the member and each secured thereto at one point in the ring circumference and divided at a diametrically opposite point to provide two separable ends, two devices slidably supported in the stationary member for movement substantially parallel with the axis thereof and secured to the end portions of the rings on opposite sides of the division therein, two additional devices slidably supported in the stationary member for movement substantially parallel with the axis thereof and secured to the rings at points approximately ninety degrees from the points at which the rings are secured to the member, and means to slide the members as required to form the rings selectively into a right-hand or a left-hand helix, thereby moving the blade along the slot in the direction necessary to engage and sever the bar.

14. Apparatus for severing longitudinally traveling bars comprising a revoluble hollow drum having a slot in its peripheral wall, the slot extending longitudinally of the drum, a blade mounted in the slot and slidable along the same, means to guide each approaching bar in a path adjacent the drum and tangential thereto, a stationary member located within the drum, a plurality of spaced coaxial rings mounted on the member and each divided at one point to provide two separable ends, the rings having a neutral position in which they lie in parallel planes perpendicular to their axis, means to shift the ends of the rings and form the rings selectively into either a right-hand or a left-hand helix, the inner portion of the blade projecting between the rings so that the blade can be moved along the slot in the direction necessary to engage and sever the bar, and a safety mechanism to prevent shifting the ends of the rings while the blade is closely approaching the point of division of the rings.

CHARLES W. HAWTHORNE.